(12) United States Patent
Parello et al.

(10) Patent No.: US 9,660,725 B2
(45) Date of Patent: May 23, 2017

(54) IDENTIFIER ANNOUNCEMENT AND DETECTION SCHEME FOR POE FIXTURES

(71) Applicant: Cisco Technology, Inc., San Jose, CA (US)

(72) Inventors: John D. Parello, Campbell, CA (US); Donald Schriner, Fishers, IN (US); Luis O. Suau, Davie, FL (US); Xiaohang Li, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 14/446,608

(22) Filed: Jul. 30, 2014

(65) Prior Publication Data

US 2016/0036526 A1 Feb. 4, 2016

(51) Int. Cl.
*H04B 10/00* (2013.01)
*H04B 10/116* (2013.01)
*H04B 10/114* (2013.01)

(52) U.S. Cl.
CPC ....... *H04B 10/116* (2013.01); *H04B 10/1149* (2013.01); *H04B 10/114* (2013.01)

(58) Field of Classification Search
None
See application file for complete search history.

(56) References Cited

U.S. PATENT DOCUMENTS

| | | | |
|---|---|---|---|
| 8,255,487 B2 | 8/2012 | Valois | |
| 8,334,901 B1 | 12/2012 | Ganick et al. | |
| 8,352,769 B1 | 1/2013 | Ghose et al. | |
| 8,432,438 B2 | 4/2013 | Ryan et al. | |
| 8,436,896 B2 | 5/2013 | Staats et al. | |
| 8,457,502 B2 | 6/2013 | Ryan et al. | |
| 8,570,160 B2 | 10/2013 | Speegle et al. | |
| 8,588,809 B2 | 11/2013 | Seavey et al. | |
| 8,594,510 B2 * | 11/2013 | Schenk | H05B 37/02 315/152 |
| 8,699,887 B1 * | 4/2014 | Rothenberg | H04B 10/116 315/158 |
| 8,732,501 B1 | 5/2014 | Ghose et al. | |
| 8,745,429 B2 | 6/2014 | Ghose et al. | |
| 9,521,722 B2 * | 12/2016 | Wong | F21V 23/0464 |

(Continued)

OTHER PUBLICATIONS

Ma, Maode, Current Research Progress of Optical Networks, 2009, Springer, pp. 120-122.*

(Continued)

*Primary Examiner* — Ken N Vanderpuye
*Assistant Examiner* — Jai Lee
(74) *Attorney, Agent, or Firm* — Edell, Shapiro & Finnan, LLC (57) ABSTRACT

Techniques are presented herein to enable identification of light fixtures. A light fixture modulates light emitted by the light fixture with an identifier associated with the light fixture. The identifier may be encoded or encrypted before it is modulated. In one example, the identifier is a Universally Unique Identifier (UUID). A user device is positioned to detect light emitted by the light fixture. The user device demodulates the light to obtain the identifier. The identifier, time and location associated with detection of the identifier are sent to a management entity for use in provisioning the light fixture on a network.

20 Claims, 5 Drawing Sheets

(56) References Cited

U.S. PATENT DOCUMENTS

| | | | |
|---|---|---|---|
| 2006/0239689 A1* | 10/2006 | Ashdown | H04B 10/1141 398/130 |
| 2006/0285501 A1* | 12/2006 | Damm | H04L 41/142 370/252 |
| 2008/0002976 A1* | 1/2008 | Tal | H04J 3/1694 398/58 |
| 2008/0080415 A1* | 4/2008 | Stephenson | H04W 24/02 370/328 |
| 2009/0171571 A1* | 7/2009 | Son | G01C 21/20 701/532 |
| 2011/0069971 A1* | 3/2011 | Kim | H04B 10/1149 398/172 |
| 2012/0271477 A1* | 10/2012 | Okubo | H04L 12/10 700/297 |
| 2012/0317205 A1* | 12/2012 | Lahiani | G06Q 10/10 709/206 |
| 2012/0329474 A1 | 12/2012 | Seavey et al. | |
| 2013/0107041 A1* | 5/2013 | Norem | H04N 5/225 348/143 |
| 2013/0128727 A1* | 5/2013 | Farley | H04Q 1/136 370/228 |
| 2013/0241699 A1* | 9/2013 | Covaro | G06K 7/10009 340/10.1 |
| 2014/0328599 A1* | 11/2014 | Pederson | H04B 10/116 398/118 |
| 2015/0147067 A1* | 5/2015 | Ryan | H04B 10/116 398/118 |
| 2015/0163881 A1* | 6/2015 | Pederson | H05B 33/0863 315/154 |

OTHER PUBLICATIONS

Agnew, Grace, Digital Rights Management, 2008, Elsevier, p. 130.*
Travis et al., Web Services Implementation Guide, 2002, Architag Press, pp. 220-222.*
Bradner, Scott, TCP/IP for Dummies, 2009, Wiley Publishing, Inc., 6th Edition, pp. 81-82.*
DUX Computer Digest, http://www.duxcw.com/faq/ocs/diffrout.htm.*
Cooper Lighting, "A Commercial Emergency Light," Product Selection Guide | Sixth Edition, retrieved from http://www.cooperindustries.com/content/dam/public/lighting/products/documents/atlite/spec_sheets/at-a-commercial-emergency-light-psgpage.pdf, on Jul. 30, 2014, 1 page.
Laherty, "Light-as-a-Service: Why IT and Lighting Will Converge," Cisco Blog > Enterprise Networks, Jun. 29, 2012, retrieved from http://blogs.cisco.com/enterprise/light-as-a-service-why-it-and-lighting-will-converge/, on Jul. 30, 2014, 6 pages.
Castle, "NuLEDs Launches PoE Lighting Solution for LEDs," CEPro, Jun. 28, 2012, retrieved from http://www.cepro.com/article/nuleds_launches_poe_lighting_solution_for_leds/, on Jul. 30, 2014, 3 pages.
nuLEDs, "PoE LED Lighting How It Works," retrieved from http://www.nuleds.com/technology.html, on Jul. 30, 2014, 3 pages.
Primex Wireless, "SNS™ Emergency Lights," Product Data Sheet, retrieved from www.primexwireless.com/uploads/files/SNS_Emergency_Lights.pdf, on Jul. 30, 2014, 2 pages.

* cited by examiner

IDENTIFIER ANNOUNCEMENT AND DETECTION SCHEME FOR POE FIXTURES

TECHNICAL FIELD

The present disclosure relates to control of light fixtures.

BACKGROUND

It is possible to transmit data by modulating the brightness of a light fixture, such as a light emitting diode (LED) light fixture. As commercial lighting moves to LED technology as a result of the increases in LED efficacy, it is now possible to power commercial light fixtures using Power-over-Ethernet (PoE), PoE Plus (PoE+), and Universal PoE (UPOE).

DESCRIPTION OF EXAMPLE EMBODIMENTS

Overview

Techniques are presented herein to enable identification of light fixtures. A light fixture modulates light emitted by the light fixture with an identifier associated with the light fixture. The identifier may be encoded or encrypted before it is modulated. Various forms of an identifier are presented herein. A user device is positioned to detect light emitted by the light fixture. The user device demodulates the light to obtain the identifier. The identifier, time and location associated with detection of the identifier are sent to a management entity for use in provisioning the light fixture on a network.

Example Embodiments

Presented herein are techniques to enable a light fixture, such as an LED light fixture, to transmit a unique identification and other pertinent information for the purposes of advanced communication and interaction with other devices.

Figure 1:
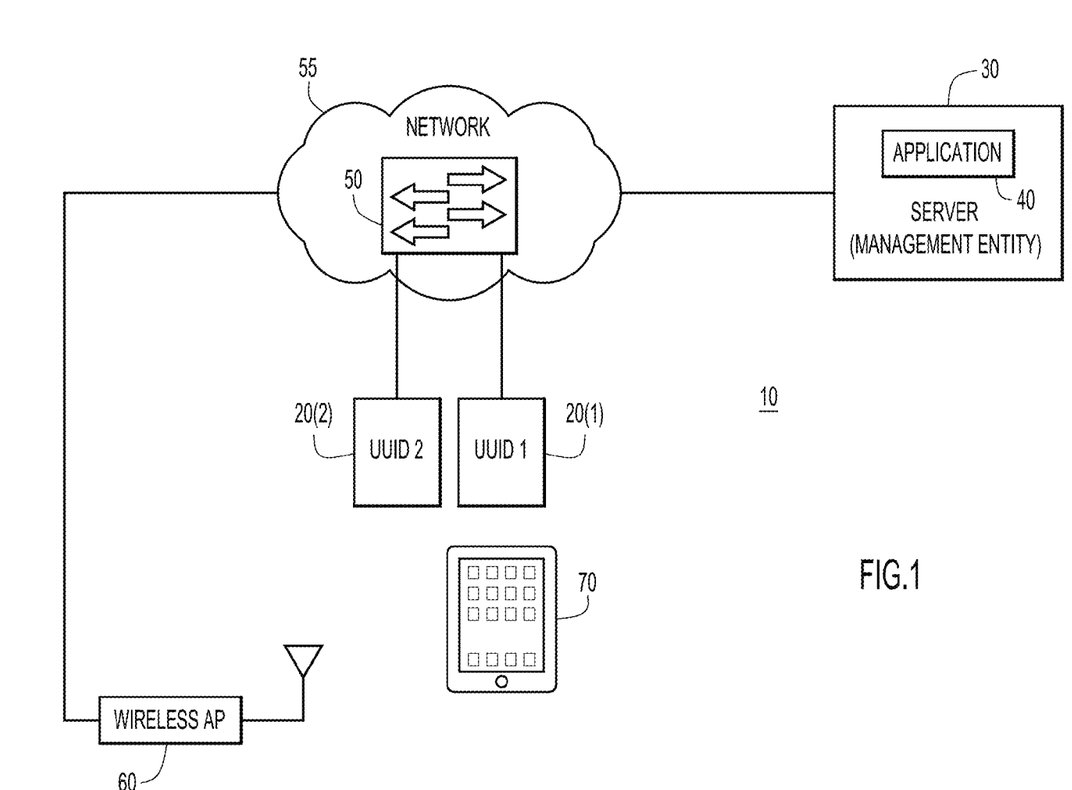
FIG. 1 is a block diagram of a system according to an example embodiment.

Referring first to FIG. 1, a system 10 is shown that includes light fixtures 20(1) and 20(2), a server (management entity) 30 running an application 40, a Power-over-Ethernet (PoE) switch 50 in a network 55, a wireless access point (AP) 60 and a user device 70. The light fixtures 20(1) and 20(2) are, for example, light emitting diode (LED) light fixtures with PoE capability. That is, the light switches 20(1) and 20(2) are powered over a network connection. The server 30 is a physical or virtual server (running in a data center or cloud computing environment) and application 40 is a light management application that performs various management functions, such as provisioning and commissioning functions for light fixtures. The server 30 has connectivity to network 55.

The light fixtures 20(1) and 20(2) connect to PoE switch 50 and are powered by PoE power source capability of the switch 50. As described further hereinafter, each light fixture 20(1) and 20(2) emits light modulated with an associated identifier, such as a Universally Unique Identifier (UUID). For example, light fixture 20(1) emits light modulated with UUID 1 and light fixture emits light modulated with UUID 2. A UUID is only one example of an identifier, and presented here are other forms of an identifier that may be associated with a light fixture. The emitted light carrying the identifier may be human visible or non-visible light, and it may be emitted on a continuous/constant basis, periodic basis or on-demand/occasional basis.

The user device 70 may be a hand-held device, such as a tablet computer, Smartphone, camera, or any device having a light sensor/detector. The user device 70 detects the emitted light within the field of the light fixture, e.g., light fixture 20(1) in the example of FIG. 1, and demodulates the detected light to obtain/extract the identifier carried by the emitted light. Detecting the identifier of a nearby fixture can enable numerous location-based and other applications. Three pieces of information can be the basis for these applications: (a) identifier, (b) location at which the light was detected and identifier was obtained, and (c) time of detection.

The user device 70 can send a message to the server 30 by way of wireless AP 60 that is connected to network 55. Alternatively, the user device 70 may be connected by a wired connection to a network in order to send the message to the server 30. The message may include the identifier obtained from detected light from a fixture, location at which the light was detected and identifier was obtained, and time of detection. The location may be derived based on various location technologies used in wireless local area networks, such as those based on receive signal strength indication (RSSI), time of arrival, time difference of arrival, etc. To this end, there are typically numerous wireless APs in the vicinity of the user device 70 from which transmissions can be received for purposes of measurements used for location computations. The location computations can be made by a wireless network controller or by the server 30. Another way to obtain the location of the user device 70 when a light fixture detection is made is to use a Global Positioning System (GPS) measurement with a GPS receiver in the user device 70.

Figure 2:
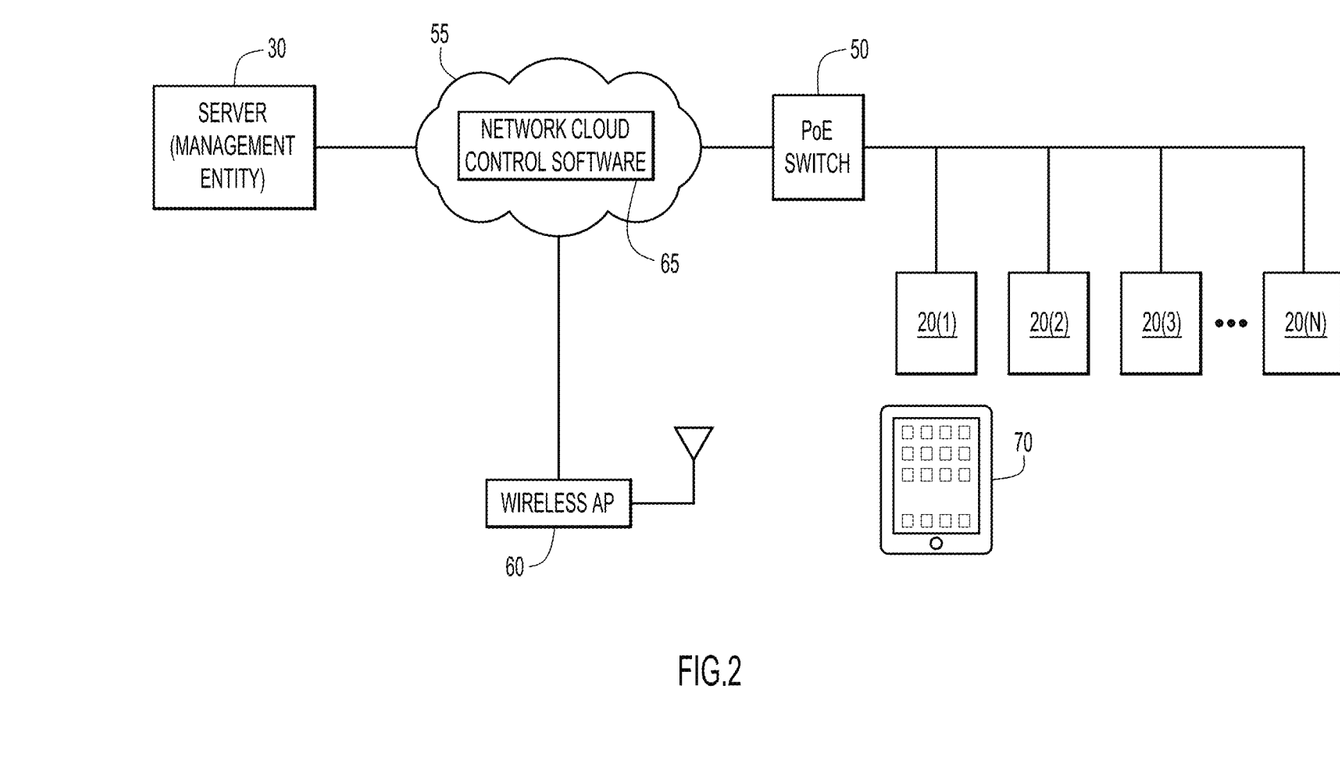
FIG. 2 is a block diagram of a system according to another example embodiment.

FIG. 2 is similar to FIG. 1, but shows that there are typically numerous light fixtures 20(1)-20(N) within a building. In addition, FIG. 2 shows network cloud control software 65 running in the network 55. The network cloud control software 65 is used to manage network devices, such as PoE switch 50, and can be used to assist in managing light fixtures 20(1)-20(N). One role/function of the network cloud control software 65 is to implement lighting management policies, e.g., when the lights turn on/off and how bright they should be. A second function is energy measurement/reporting. A third function is to perform analytics, such as detecting light fixture failure if the energy consumption is out of scope to the set policy.

Figure 3:
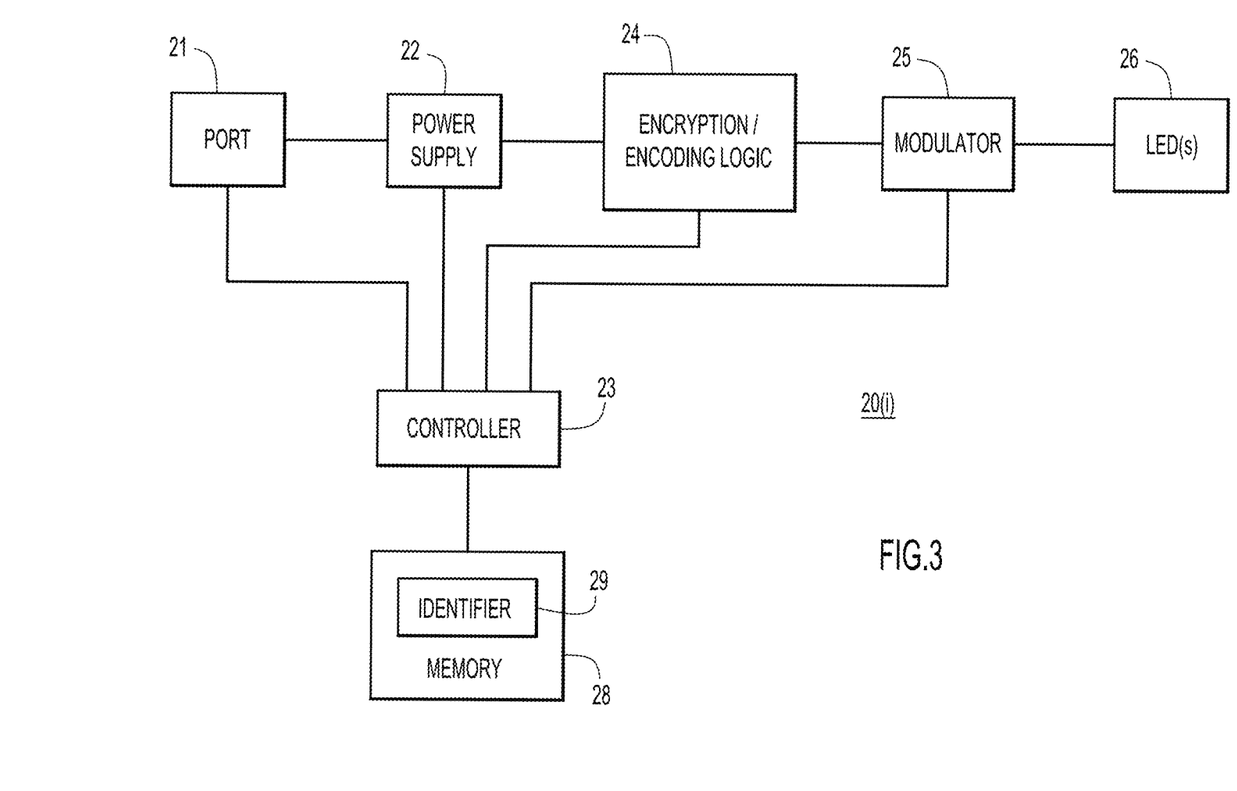
FIG. 3 is a block diagram of a light fixture according to an example embodiment.

Turning now to FIG. 3, a description of a light fixture configured to participate in the techniques presented herein, is now described. The light fixture, shown by generic reference numeral 20(i), includes an Ethernet port 21, power supply 22, a controller 23, optional encryption/encoding logic 24, a modulator 25, and one or more LEDs 26. In addition, a memory 28 is provided that stores, among other things, an identifier for the light fixture. Again, the identifier 29 may be a UUID or some other form of an identifier.

Power from a PoE power source (PoE switch 50 shown in FIGS. 1 and 2) is conveyed to the light fixture via port 21, and to power supply 22. Power supply 22 converts the power to the applicable voltages and currents used by the other components of the light fixture 20(*i*). The controller 23 is, for example, a microprocessor or microcontroller, with onboard and/or external memory, e.g., memory 28. The optional encryption/encoding logic 24 may be one or more separate hardware blocks/chips or may be implemented in software that is executed by the controller 23. The encryption/encoding logic 24 is optionally provided to enable security with respect to the identifier before it is modulated by the modulator 25 onto a light carrier. The encryption/encoding logic 24 may perform any suitable encryption and/or encoding that is useful to encrypt or encode an identifier. The key used for the encryption and/or the encoding scheme used for encoding the identifier needs to be known on the user device 70 (FIGS. 1 and 2) that is to detect the emitted light and decrypt and/or decode the modulated light to recover the identifier.

The modulator 25 is configured to modulate the input signal to the LEDs 26. Specifically, the modulator 25 takes the identifier 29, either encrypted and/or encoded by the encryption/encoding logic 24 or not, and modulates the input signal to the LED so that the LED outputs light with a carrier modulated by the identifier (encrypted/encoded or not). The modulator 25 may use any type of modulation scheme to modulate the input signal to the LEDs 26. Depending on the parameter of a light beam which is manipulated, the modulator 25 may be an amplitude modulator, phase modulator, or polarization modulator, etc. One way to modulate the intensity of a light beam is to modulate the current driving the light source, e.g. the LED. This is called direct modulation, as opposed to external modulation performed by a light modulator. For this reason light modulators are, e.g. in fiber optic communications, called external light modulators.

Thus, direct light modulation is accomplished within the radiation source (e.g., by modulating the input/drive signal to a light source, e.g., an LED), and external modulation, which is produced by special devices called light modulators. Light detectors of all types react to variations in light intensity—that is, in the amplitude of its oscillations. Consequently, modulation of the frequency, phase, or polarization are converted in practice to amplitude modulation—either directly in the modulator or before the photodetector (called heterodyne detection). The harmonic composition of the amplitude-modulated light depends on the initial form of modulation and the method of conversion to amplitude modulation.

The main parameters that characterize amplitude modulation of light are the fundamental frequency and the frequency bandwidth of the modulating signal; the depth of modulation $m=(I/_{max}-I_{min}(I/_{max}+_{min})$, where I is the luminous flux; and the absolute value of the modulation amplitude and the transmittance of the modulator (the power of the signal registered by the detector depends on these factors). Direct amplitude modulation of light is achieved, for example, by varying the supply voltage and current of an artificial source of radiation in accordance with a specific law.

One type of light modulator is a mechanical device that is able to interrupt the luminous flux for certain specific time intervals. For example, rotating disks with holes (shutters), gratings, vibrating or rotating vanes, mirrors, and prisms, as well as devices in which controlled disturbance of optical contact by a modulating (non-optical) signal takes place.

Still another type of device used for external amplitude modulation of light is a modulator that operates by controlling light absorption in semiconductors. The absorption is a function of the concentration and mobility of free charge carriers in the semiconductor (free electrons and holes), and they may be controlled by varying the voltage and current.

The effects most frequently used for light modulation, which cause variation of the index of refraction of an optical medium under the influence of an external field (the modulating signal), are electro-optical (the Kerr and Pockels effects), magneto-optical (the Faraday effect), and acousto-optical. In modulators operating on the basis of these effects, phase modulation of the light takes place (with subsequent conversion into amplitude modulation). The frequency of the modulating signals may be as high as $10^{11}$ Hz.

The light fixture 20(*i*) may be configured to continuously/constantly modulate light with the identifier, or may be configured to modulate the light periodically, or on-demand or under control of some input, such as from server 30, or from user device 70.

Figure 4:
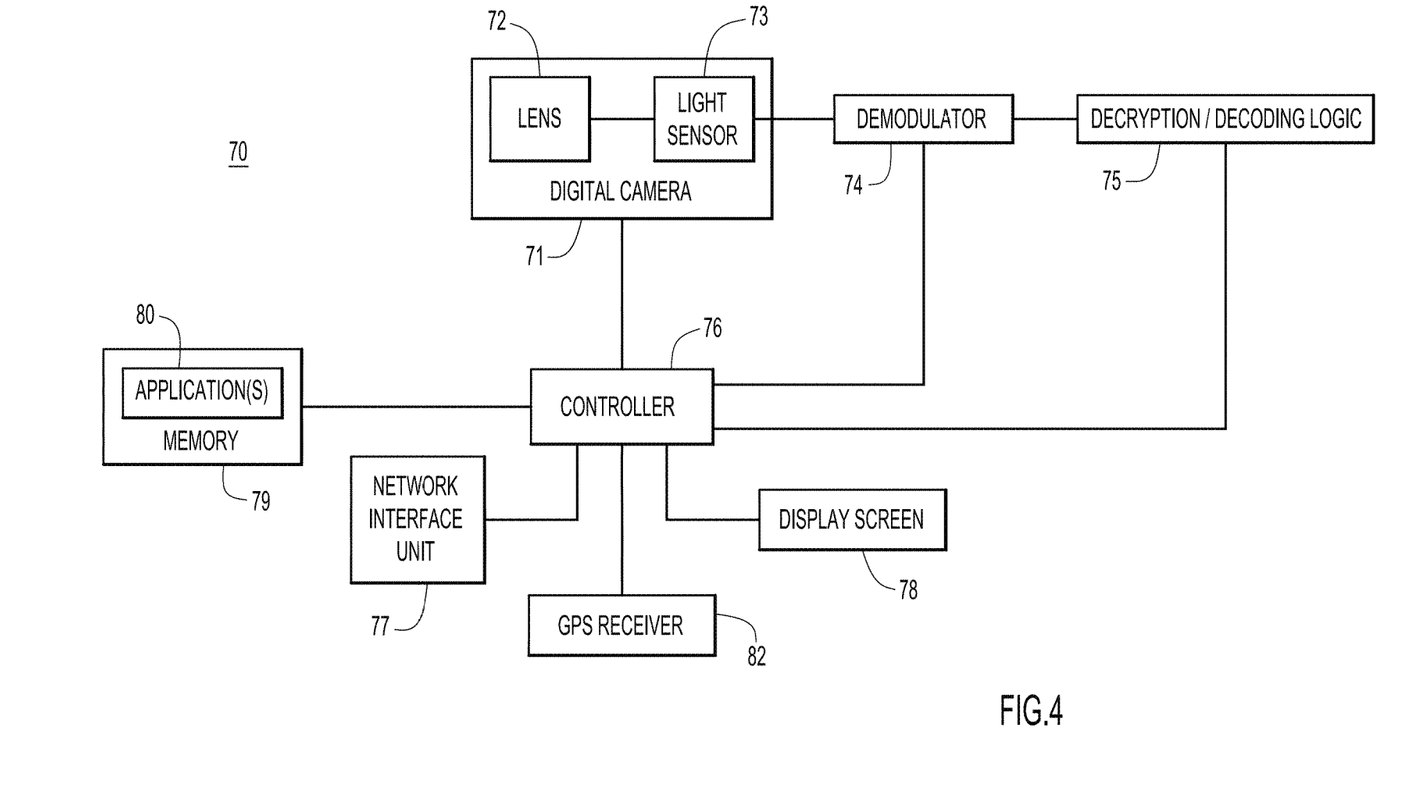
FIG. 4 is a block diagram of a user device according to an example embodiment.

Reference is now made to FIG. 4. FIG. 4 is a block diagram of a user device 70 according to an example embodiment. User device 70 can take on a variety of form factors, such as a hand-held device (e.g., Smartphone, tablet computer, laptop computer, etc.). The user device 70 includes lens 72 and light sensor 73, which together may be part of a digital camera 71. A demodulator 74 is coupled to the output of the light sensor 73. The demodulator 74 is operable to demodulate the modulated light emitted by the light fixture according to the modulation scheme used, as described above in connection with FIG. 3.

Optional decryption/decoding logic 75 is provided that is coupled to the output of the demodulator 74. A controller 76 is provided that serves as the overall control point for the device 70. The controller 76 is also connected to a network interface unit 77 and to a display screen 78. The network interface unit 77 may be a wired (Ethernet card) or wireless network interface (Wi-Fi™ module). A memory 79 is provided that stores instructions executed by the controller 76 for one or more applications 80. In addition, there is a GPS receiver 82 that is provided that can be useful for capturing a location of the device 70. One example function of an application stored in memory 79 is to package information associated with detection of an identifier form a light fixture, together with the time of detection and location of detection, into a message that is sent to the server 30 (FIG. 1).

Figure 5:
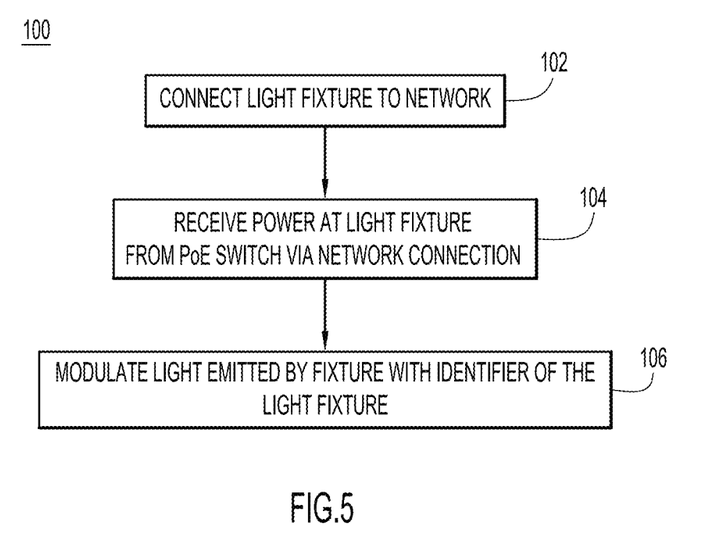
FIG. 5 is a flow chart depicting operations performed by the light fixture, according to an example embodiment.
Figure 6:
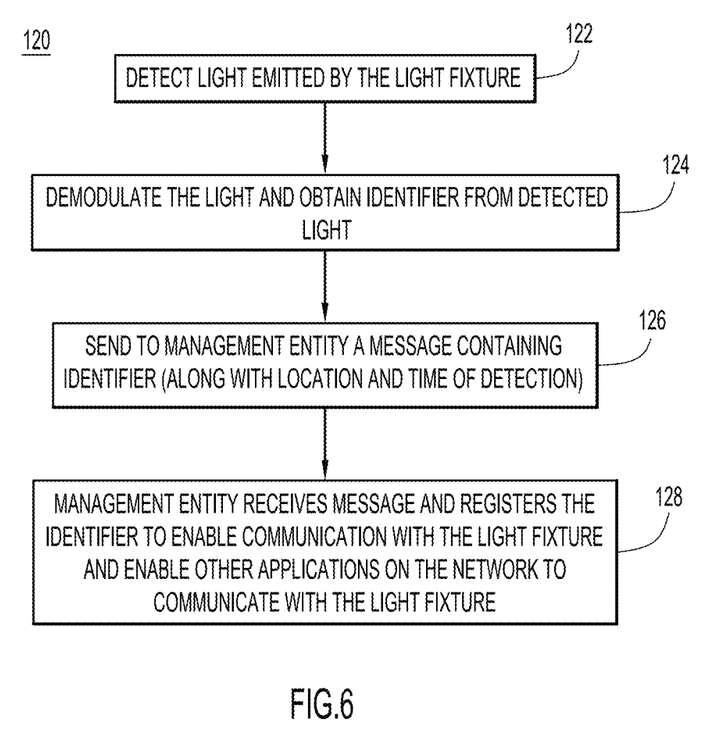
FIG. 6 is a flow chart depicting operations performed by the user device and a management entity, according to an example embodiment.

Reference is now made to FIGS. 5 and 6, which are flow charts that illustrate uses of the light fixtures 20(*i*) and device 70, described above. In FIG. 5, a method 100 is shown for operation of a light fixture. At 102, the light fixture is connected to the network, e.g., by plugging a network cable to a port of the fixture. At 104, power is received at the light fixture from the PoE switch (e.g., PoE switch 50) via the network connection. At 106, the light fixture modulates the light that it emits with an identifier associated with the light fixture. As explained above in connection with FIG. 3, the identifier may be stored in a memory of the light fixture, or otherwise provisioned into a component of the light fixture at the time of manufacture.

The identifier of the light fixture can also be generated and take on a form other than Universally Unique Identifier (UUID). In one example, the identifier of the light fixture is generated by a joint combination of the current timestamp that the fixture obtains connectivity to a switch (e.g., switch 50 in FIG. 1), a media access control (MAC) address of the light fixture, a port number of the switch to which the fixture connects (again, e.g., switch 50 in FIG. 1), a location measurement of the light fixture, and a sequence number.

The location measurement can be configured into the switch (e.g., switch 5) when the light fixture is set up to join the switch. One possibility to identify the location measurement is to evenly divide an area of interest into small cells: each cell may have the same size and is assigned with a unique identifier. The small cell identifier and its corresponding location information are stored as a hash map in the switch. The small cell location identifier is used as the location part of unique identifier of the switch.

The sequence number is used to prevent the light fixture from sending too much identifier information at a given time interval. In other words, the sequence number indicates a number of times that the identifier is modulated on light emitted by the light fixture during a given time interval.

Thus, the identifier of the light fixture could be constructed in the following form:
Timestamp--MAC address--Port Number--Location Measurement--Sequence Number.

In one example, the sequence number ranges from 0 to 4095 and takes 12 hexadecimal digits; the location measurement takes 12 hexadecimal digits; the port number takes 6 hexadecimal digits; and the MAC address takes 12 hexadecimal digits.

After a unique identifier for the light fixture is generated, the modulator 25 of the light fixture (see FIG. 2) modulates the unique identifier onto the light emitted by the light fixture. A hexadecimal digit can be represented by a 4 bit stream, e.g., 'a' could be '1010'. A stream of "1-0" bits can represent the unique identifier. Then, on the 1-0 bit stream, various modulation schemes could be used, such as Binary Phase Shift Keying (BPSK), Quadrature Phase Shift Keying (QPSK), etc.

Example pseudo-code for generating the unique light fixture identifier is listed below:

```
function UIPFID($timestamp, $mac_addr, $por_num, $location_id,
$sequence)
{
    $value = $timestamp<<42 | $mac_addr<<30 | $port_num<<24 |
    $location_id<<12 |
$sequence
    return $value;
}
function generate ( )
{
    $ t = getTimeStamp( );
    $mac_addr = getPOEMacAddress( );
    $port_num = getPortNum( );
    $location_id = getPOELocation( );
    if($t != lastTime) {
        $sequence = 0;
        $lastTime = $t;
    } else {
        $sequence++;
        if($sequence > 4095)
            return Error;
    }
    return UIPFID($t, $mac_addr, $port_num, $location_id,
    $sequence);
}
```

By calling the function 'generate', the user can construct a possible realization of an identifier for lighting fixture, using timestamp, MAC address, port number, location, and sequence number. Other possible realizations of an identifier can also be generated in a similar way.

FIG. 6 illustrates operations of method 120, which includes operations performed by user device 70 and by server 30. At 122, a user device is pointed in the direction of the light fixture to detect light emitted by the light fixture. At 124, the user device demodulates the detected light and obtains an identifier from the detected light. In addition, if the identifier is encoded or encrypted, the device will also decode and/or decrypt the identifier. Also at 124, the user device may determine the time associated with detected the light and also the location at which the user device detected the light (using GPS or other techniques, such as Wi-Fi location techniques).

Example of pseudo-code to read the information modulated on the light is listed below:

```
function read_UIPF($light_bit_stream)
{
    $light_hex_stream = Bit2Hexadecimal($light_bit_stream);
    $location_id = getLastDigits($light_hex_stream>>12, 12);
    // read the last 12-24 hexadecimal digits as the location_id, the
sequence number is ignored.
    $port_num = getLastDigits($light_hex_stream>>24, 6);
    $mac_addr = getLastDigits($light_hex_stream>>30, 12);
    $t = getLastDigits($light_hex_stream>>42, 12);
}
```

At 126, the user device sends to the management entity (e.g., server 30) a message containing an identifier, the time of detection, and the location of detection. This message may be transmitted via Wi-Fi to a wireless AP to which the device is associated.

At 128, the management entity receives the message, and registers the identifier in a database to enable network communication with the light fixture, and to enable other applications on the network to communicate with the light fixture. In registering the light fixture, the management entity may take into account time and location information contained in the message, in order to ensure that the light fixture is authorized to be enabled on the network. For example, if the message reports a location that is not associated with an authorized location for light fixtures under management of the management entity, then it will not register the light fixture.

The following table is an example of data stored at the management entity:

| Detected Location | Time of Detection | Fixture Identifier | Registered? |
|---|---|---|---|
| Building J-(Lat1, Long2) | 11:10 AM 06-12-2013 | 550e8400-e29b-41d4-a716-4466554402312 | Yes |
| Building K-(Lat2, Long3) | 1:15 PM 07-15-2013 | 572e8300-d19c-32e4-b415-2236514106512 | No-not authorized location |
| ... | | | |

In the example of the table shown above, the management entity receives a message with a fixture identifier "550e8400-e29b-41d4-a716-4466554402312" with a time of detection of "11:10 AM, on Jun. 12, 2013", at a location "Building J-(Lat,Long2)." The management entity would search stored data for authorized locations and associated validity time periods for those locations, and determine that the fixture detected at location "Building J-(Lat,Long2)" at time "11:10 AM, on Jun. 12, 2013" is a valid fixture, and thus the fixture should be registered and enabled for network communication, association in a light fixture control group, etc. By contrast, the fixture identifier "572e8300-d19c-32e4-b415-2236514106512" detected at "1:15 PM on Jul. 15, 2013" at "Building K-(Lat2,Long3)" is determined not to be at an authorized location, and thus, that fixture is not registered and not enabled for network communication.

To summarize, FIG. 5 and FIG. 6 depict an example use case to provision a light fixture. Before a light fixture can be provisioned and enabled for network communication, it needs to be identified. FIGS. 5 and 6 illustrate a way to identify a light fixture by simply holding a device up to the light emitted by the fixture. Once the light fixture has been identified and set up on the network by the management entity, then it can be provisioned via the network so that it can be grouped with other light fixtures for various control applications, etc.

Current provisioning techniques are very manual. A person needs to connect power to the light fixture, then connect a serial cable to it and connect it to a controller. Provisioning a light fixture by capturing an identifier contained in the light emitted by the fixture greatly expedites and simplifies the provisioning process.

Other uses for these techniques include guiding a person from one place to another through a building by detecting light fixtures as the person moves. Movement of a hand-held device can be determined based on what light fixtures the person has been under and detected, thus revealing the location of the device that detected the light fixtures (since the light fixtures are at fixed known locations).

In summary, in accordance with one aspect, a method is provide comprising: receiving power at a light fixture via a network connection at the light fixture; retrieving an identifier associated with the light fixture from a component of the light fixture; and modulating light emitted by the light fixture with the identifier.

In accordance with another aspect, a method is provided comprising: detecting with a device light emitted from a light fixture; demodulating the light to obtain an identifier; determining a time associated with detecting light emitted by the fixture and obtaining the identifier, and a location at which the identifier is obtained from detected light; and sending to a management entity a message that includes the identifier, the time and the location.

In accordance with another aspect, an apparatus is provided comprising: a network port that receives communications and power from a power source on a network; a power supply coupled to the network port; at least one LED light; and a modulator coupled to the power supply that modulates a drive input to the LED light in order to modulate light emitted by the LED light with an identifier.

In accordance with still another aspect, a system is provided comprising: at least one light fixture that emits light modulated with an identifier associated with the light fixture; a user device that detects light emitted from the light fixture, demodulates the light to obtain the identifier of the light fixture, and sends a message containing the identifier; and a management entity that receives the message containing the identifier and registers the identifier of the light fixture to enable network communication with the light fixture by one or more applications.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving power at a light fixture from a network switch when the light fixture establishes network connectivity with the network switch;
   generating an identifier at the light fixture based on information obtained from the network switch when network connectivity with the network switch is established, wherein the identifier includes a location identifier indicating a location of the network switch; and
   modulating light emitted by the light fixture with the identifier.

2. The method of claim 1, further comprising encrypting the identifier.

3. The method of claim 1, further comprising generating the identifier based on a combination of a timestamp associated with time of connectivity of the light fixture to the network switch, a Media Access Control (MAC) address of the light fixture, a port number of a port of the network switch to which the light fixture connects and a location measurement configured in the network switch as part of a unique identifier of the network switch, wherein the location measurement is identified by evenly dividing an area of interest into small cells, each cell has a same size and is assigned a unique identifier.

4. The method of claim 3, wherein generating the identifier comprises including a sequence number indicating a number of times that the identifier is modulated on light emitted by the light fixture during a given time interval.

5. The method of claim 1, further comprising:
   detecting with a device light emitted by the light fixture; and
   demodulating the light to obtain the identifier.

6. The method of claim 5, further comprising:
   determining a time associated with detecting light emitted by the fixture and obtaining the identifier, and a location at which the identifier is obtained from detected light.

7. The method of claim 6, further comprising:
   sending to a management entity a message that includes the identifier, time and location.

8. The method of claim 7, further comprising:
   at the management entity, receiving the message;
   registering the identifier of the light fixture to enable network communication with the light fixture by one or more applications.

9. A method comprising:
   detecting with a mobile device light emitted from a light fixture, the light fixture being connected to a network;
   demodulating, by the mobile device, the light to obtain an identifier associated with the light fixture, the identifier being generated based on information obtained from a network switch when the light fixture establishes network connectivity with the network switch, wherein the identifier includes a location identifier indicating a location of the network switch;
   determining, by the mobile device, a time associated with detecting the light emitted by the light fixture and obtaining the identifier, and a location at which the light emitted from the light fixture is detected; and
   sending to a management entity, by the mobile device, a message that includes the identifier associated with the light fixture, the time and the location to register the light fixture and enable the light fixture for communication with other applications on the network.

10. The method of claim 9, further comprising decrypting information derived from demodulating the light in order to obtain the identifier.

11. The method of claim 9, further comprising, at the management entity, determining whether to register the light fixture to enable network communication with the light fixture, based on the identifier, the time and the location.

12. The method of claim 9, wherein the identifier further includes a sequence number indicating a number of times that the identifier is modulated on light emitted by the light fixture during a given time interval.

13. An apparatus comprising:
- a network port that receives communications and power from a power source on a network;
- a power supply coupled to the network port;
- at least one light emitting diode (LED) light; and
- a modulator coupled to the power supply that modulates a drive input to the LED light in order to modulate light emitted by the LED light with an identifier that is generated based on information obtained from the power source when network connectivity with the power source is established, wherein the identifier includes a location identifier indicating a location of the power source, the information obtained from the power source includes a location measurement configured in the power source as part of a unique identifier of the power source, and the location measurement is identified by evenly dividing an area of interest into small cells, each cell has a same size and is assigned a unique identifier.

14. The apparatus of claim 13, further comprising encryption logic that encrypts the identifier prior to modulation by the modulator.

15. The apparatus of claim 13, wherein the identifier further includes a sequence number indicating a number of times that the identifier is modulated on light emitted by the light fixture during a given time interval.

16. A system comprising:
- at least one light fixture that emits light modulated with an identifier associated with the light fixture, the identifier being generated based on information obtained from a network switch when the light fixture establishes network connectivity with the network switch, wherein the identifier includes a location identifier indicating a location of the network switch;
- a user device that detects light emitted from the light fixture, demodulates the light to obtain the identifier of the light fixture, determines a location of detecting the light emitted by the light fixture and sends a message containing the identifier and the location of detecting the light; and
- a management entity that receives the message containing the identifier and registers the identifier of the light fixture and the location of detecting the light to enable network communication with the light fixture by one or more applications.

17. The system of claim 16, wherein the user device determines a time and a location associated with obtaining the identifier, and includes the time and the location in the message sent to the management entity.

18. The system of claim 17, wherein the management entity uses the time and the location contained in the message to determine whether to register the identifier of the light fixture.

19. The system of claim 16, wherein the light fixture includes:
- a network port that receives communications and power from the network switch coupled to a network;
- a power supply coupled to the network port;
- at least one light emitting diode (LED) light; and
- a modulator coupled to the power supply that modulates a drive input to the LED light in order to modulate light emitted by the LED light with the identifier, wherein the identifier is generated based on information obtained from the network switch, which includes a location measurement configured in the network switch as part of a unique identifier of the network switch, and the location measurement is identified by evenly dividing an area of interest into small cells, each cell having a same size and is assigned a unique identifier.

20. The system of claim 16, wherein the identifier further includes a sequence number indicating a number of times that the identifier is modulated on light emitted by the at least one light fixture during a given time interval.

* * * * *